(12) United States Patent
Wen et al.

(10) Patent No.: US 10,366,124 B2
(45) Date of Patent: Jul. 30, 2019

(54) DYNAMIC GROUPING OF IN-MEMORY DATA PROCESSING OPERATIONS

(71) Applicant: Oracle International Corporation, Redwood Shores, CA (US)

(72) Inventors: Jian Wen, Hollis, NH (US); Sam Idicula, Santa Clara, CA (US); Nitin Kunal, Zurich (CH); Negar Koochakzadeh, Vancouver (CA); Seema Sundara, Nashua, NH (US); Thomas Chang, Redwood Shores, CA (US); Aarti Basant, Fremont, CA (US); Nipun Agarwal, Saratoga, CA (US); Farhan Tauheed, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 112 days.

(21) Appl. No.: 15/616,777

(22) Filed: Jun. 7, 2017

(65) Prior Publication Data
US 2018/0357331 A1 Dec. 13, 2018

(51) Int. Cl.
G06F 17/30 (2006.01)
G06F 16/903 (2019.01)
G06F 9/48 (2006.01)

(52) U.S. Cl.
CPC .......... *G06F 16/90335* (2019.01); *G06F 9/48* (2013.01)

(58) Field of Classification Search
USPC .......................... 707/718–720, 713; 717/136
See application file for complete search history.

(56) References Cited

U.S. PATENT DOCUMENTS 6,549,931 B1 4/2003 Amor et al.
6,820,262 B1 11/2004 Tellez
(Continued)

OTHER PUBLICATIONS

P. G. Selinger et al., "Access Path Selection in a Relational Database Management System,", Proc. 1979 ACM SIGMOD Int. Conf. Manag. data, vol. 3, No. 2, pp. 23-34, 1979.
(Continued)

*Primary Examiner* — Hung T Vy
(74) *Attorney, Agent, or Firm* — Hickman Palermo Becker Bingham LLP

(57) ABSTRACT

Techniques are described herein for grouping of operations in local memory of a processing unit. The techniques involve adding a first operation for a first leaf operator of a query execution plan to a first pipelined group. The query execution plan includes a set of leaf operators and a set of non-leaf operators. Each leaf operator of the set of one or more leaf operators has a respective parent non-leaf operator and each non-leaf operator has one or more child operators from among the set of leaf operators or others of the set of non-leaf operators. The techniques further involve determining a memory requirement of executing the first operation for the first leaf operator and executing a second operation for the respective parent non-leaf operator of the first leaf operator. The output of the first operation is input to the second operation. The techniques further involve determining whether the memory requirement is satisfied by an amount of local memory. If it is determined that the memory requirement is satisfied by the amount of local memory the second operation for the respective parent non-leaf operator is added to the first pipelined group. The techniques further involve assigning the first pipelined group to a first thread and the first thread executing the first pipelined group. Executing the first pipelined group involves: storing first output of the first operation in the local memory of the first thread; using the first output as input for the second operation; storing second output of the second operation in the local memory; and moving second output from the local memory to a tier of memory different than the local memory relative to the first thread.

18 Claims, 5 Drawing Sheets

(56) References Cited

U.S. PATENT DOCUMENTS

| | | | |
|---|---|---|---|
| 7,293,011 B1 | 11/2007 | Bedi et al. | |
| 7,809,713 B2 | 10/2010 | Su et al. | |
| 7,877,373 B2* | 1/2011 | Zait | G06F 17/30463 707/713 |
| 2013/0125097 A1* | 5/2013 | Ebcioglu | G06F 17/5045 717/136 |
| 2018/0144006 A1 | 5/2018 | Chavan | |

OTHER PUBLICATIONS

Zhou et al., "Buffering Database Operations for Enhanced Instruction Cache Performance", SIGMOD 2004 Jun. 13-18, 2004, Paris, France. Copyright 2004, 12 pages.

Xin et al., "Shark: SQL and Rich Analytics at Scale", SIGMOD'13, Jun. 22-27, 2013, New York, New York, USA. Copyright 2013 ACM, 12 pages.

Thusoo et al., "Hive A Warehousing Solution Over a MapReduce Framework", VLDB '09, Aug. 24-28, 2009, Lyon, France Copyright 2009, 4 pages.

Pirk et al., "CPU and Cache Efficient Management of Memory—Resident Databases", Proc.—Int. Conf. Data Eng., 12 pages, dated 2013.

Neumann, Thomas, "Efficiently Compiling Efficient Query Plans for Modern Hardware", dated Aug. 29, Sep. 3, 2011, Proceedings of the VLDB Endowment, vol. 4, No. 9, 12 pages.

N. Conway, "Query Execution Techniques in PostgreSQL,", dated 2007, 63 pages.

Graefe et al., "The Volcano Optimizer Generator: Extensibility and Efficient Search", in Proceedings of IEEE 9th International Conference on Data Engineering, pp. 209-218, dated 1993.

Dittrich et al., "Efficient Big Data Processing in Hadoop MapReduce", Aug. 27, 2012, Istanbul, Turkey. Proceedings of the VLDB Endowment, vol. 5, No. 12, 2 pages.

Colgan, Maria, "In Memory Parallel Execution in Oracle Database 11gR2", Functionality, dated Sep. 27, 2009, 4 pages.

* cited by examiner

DYNAMIC GROUPING OF IN-MEMORY DATA PROCESSING OPERATIONS

FIELD OF THE DISCLOSURE

Embodiments relate to database systems and, more specifically, to grouping of operations into tasks such that each task can be fit into local memory of a processing unit to maximize the in-memory processing efficiency.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database queries are processed as a flow of database operations. Such operations, like group-by, join, and filter, run faster in local memory that is close to the processing unit than non-local storage. Local memory can be any tier of memory where data is processed and can include, for example, static random-access memory (SRAM), dedicated scratchpad memory, or cache memory. Non-local memory can be any tier of memory where processed data is moved temporarily or permanently and can include dynamic random-access memory (DRAM) or disk memory.

Local memory is usually small and it is not always feasible to fit the input and output buffers of all operations into local memory. Thus, there is a need for an optimized strategy for processing database operations in local memory.

Figure 1:
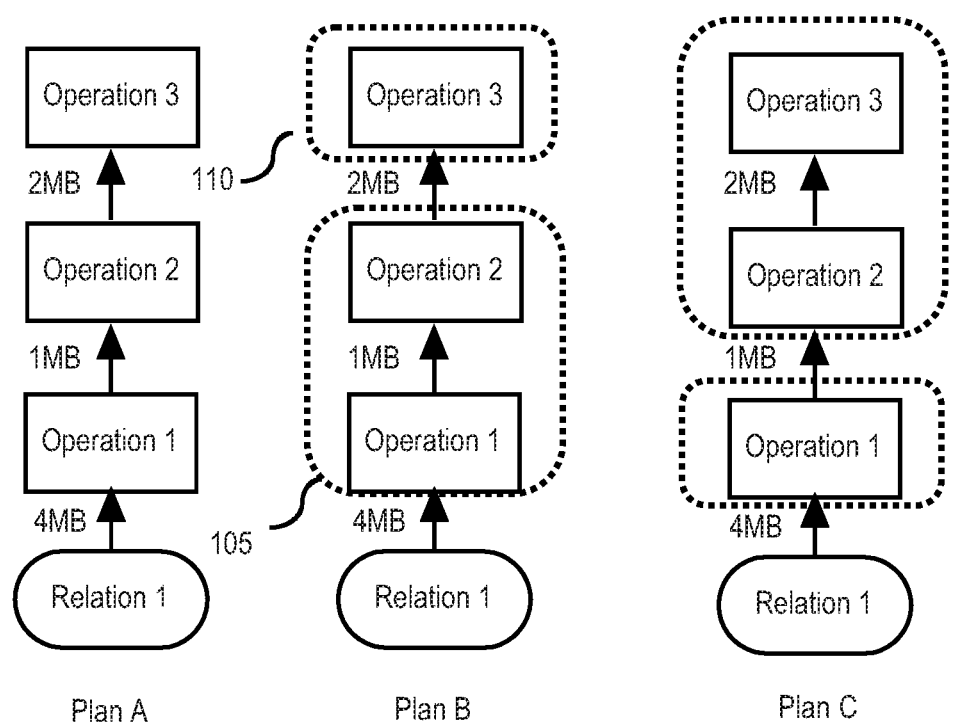
FIG. 1 depicts example query execution plans showing options for grouping operations.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order. For example, a second memory may be so named although, in reality, it may correspond to a first, second, and/or third memory.

General Overview

A query may have many operations and therefore there may also be many configurations for grouping the operations. Deciding how to group the database operations is based on determining the time cost of each configuration. Additionally, there may be multiple options for how to assign system resources between operations in a group. Therefore, a dynamic strategy is needed to consider the data statistics and operation properties at compilation time for efficient grouping.

One approach involves switching between operations at the unit of relation and transmitting larger intermediate relations through a slower memory, like disk memory. For example, one such approach may use a data processing engine (such as Hadoop) that requires a staging of intermediate results in the slower memory between operations. Another approach involves switching between operations in a unit of relation, partition, or row so that the intermediate result can be pipelined, so long as at least one of the operations is not a blocking operation. Another approach involves grouping database operations into groups, such that each group is designed to stage intermediate results entirely in local memory before sending the end result of the group through a slower media. However, in such an approach, the grouping may not be dynamically determined at compilation time.

Memory can comprise multiple tiers or levels. There may be any number of tiers or levels. A hardware processor may access a level of memory with less latency than another level of memory. For example, a core on a multi-core general processor may access scratchpad memory with far less latency than main memory comprised of DRAM, and may access main memory with far less latency that flash memory. Database operations may be run on any of the levels, and outputs of the database operations may similarly be stored and staged on any of the levels. For example, a database operation may be run on a first level and output of the database operations may be stored on a second level. With respect to a computer process running on a hardware processor, "local memory" and "non-local memory" are used to describe, in relative terms, levels of memory to which the hardware processor or a core of the hardware processor is electronically configured and wired to access with less or more latency; the local memory being a level of memory which can be accessed with less latency than the non-local memory, which is a different level of memory. For example, local memory may be memory that is electronically configured to be only accessible by one core and any thread running on that core, or may be an address range of DRAM memory that is privately allocated to a process or that is accessible to multiple processes. With respect to a core on a multi-core processor, scratchpad memory of the core is local memory with respect to DRAM main memory, and DRAM main memory is local memory with respect to FLASH memory.

In embodiments described herein, outputs of database operations are staged and retained in local memory as much as possible for direct pipelining into other database operations. In this way, local memory usage is optimized. One embodiment system utilizes a compiler-driven approach, which involves aggressive planning based on the database operation behaviors. The system determines input and output requirements as well as internal memory usage for each database operation. The system further models database operations in a cost-based way to optimize local memory allocation for different components of each database operation. The embodiment system utilizes local memory processing as much as possible and considers different heuristics to prune the search space and balance the query plan optimality and compilation efficiently.

General Architecture

Database applications interact with a database server by submitting to the database server commands that cause the database server to perform data manipulation operations on data stored in a database. For the database server to process the commands, the commands must conform to a database language supported by the database server. One database language supported by many database servers is known as the Structured Query Language (SQL).

When a database server receives the original statement of a database command from a database application, the database server must first determine which actions should be performed to execute the database command, and then perform those actions. The act of preparing for performance of those actions is generally referred to as "compiling" the database command, while performing those actions is generally referred to as "executing" the database command.

During the compilation of a query statement, the database server may perform a significant amount of preliminary work for the statement, such as parsing, semantic analysis, and query plan generation. A cursor stores the results of much of this preliminary work. For example, one set of information stored in a cursor includes the execution plan for performing the operations specified by the SQL statement.

One approach of representing an execution plan is a query operator graph (e.g., a directed acyclic graph (DAG)). At execution, traversal of a query operator graph from the bottom up yields sequences of database manipulation operations for performing a database statement. A query operator graph is composed of query operators, each representing a particular kind of database manipulation operation. During the compilation process, query operators are allocated, and each query operator is linked to zero, one, two, or more underlying query operators. The makeup of a query operator graph depends on the query and the decisions made by a query optimizer during the compilation process. Typically, a query operator graph is comprised of multiple levels. The lowest level, the leaf nodes, access rows from a database or other data store. The top query operator, the root of the graph, produces, by composition, the rows of the query that the query graph implements. The intermediate levels perform various transformations on rows produced by underlying query operators. Example database manipulation operators performed by query operators include scan, filter, group-by, expression, partition, join build, and many others.

A query operator may be configured to operate on a volume of input rows and/or output rows. Each query operator may have multiple instances or query operator tasks (hereafter tasks) which are configured to operate on a volume of rows, but which operate on separate set of rows. For example, a scan operator there may be configured to scan a same volume of rows from a table, with each task of the scan operator scanning a separate section of the table. An aggregate operator may be configured to operate on input rows from a scan operator, each task of the aggregate operator operating on output rows generated by tasks of another operator, such as a scan operator.

For purposes of convenience of expression, a query operator may be referred to as a database operation. Any input set of rows and output set of rows may be referred to herein as a table. A table, as used herein, may be any set of rows and may contain one or more columns. In addition, a query operator may have multiple inputs, such as multiple sets of rows, each being the output of another query operator. In addition, an input or output for a query operator may be something other than a set of rows. For example, a filter operator may generate a bit vector or map to indicate which rows satisfy filtering criteria.

Pipelining

One option of executing a query plan is the lineal approach. Under the lineal approach, all the tasks of a first database operation are completed, and all the output for the first database operation is generated and staged, before commencing execution of a subsequent database operation that uses the output as input. Note multiple processes and threads may be concurrently executing tasks of the first database operation, but the no other process or thread executes the subsequent database operation until all the tasks have completed the first database operation.

Under the lineal approach, due to the volume of output that needs to be staged, output of a database operation may be staged by flushing the output (usually in portions at a time) from local memory to non-local memory. Staging output by flushing the output to non-local memory is referred to herein as materializing or materializing to non-local memory.

According to an embodiment, database operations are configured and grouped into groups such that an output generated by a database operation in the group can be staged in place (i.e. retained in local memory) and used as input for another database operation in the group. In other words, the output is staged without materializing the output to non-local memory. When the output of a database operation is staged in place as input for another database operation in this way, the database operations are referred to herein as being grouped for local memory pipelining or, more simply, as being pipelined. The group may be referred to herein as a pipelined group. According to an embodiment, a pipelined group of database operations may be executed by a thread or computer process executing on a core of a multiprocessor using the scratchpad memory as local memory.

FIG. 1 depicts example query execution plans which are used to compare a lineal approach for database operations and several pipelining approaches. Referring to FIG. 1, each of execution Plans A, B, and C includes the same database operations, which include Operation 1, Operation 2, and Operation 3.

Plan A illustrates the lineal approach. In plan A, each database operation is run independently to completion to generate an output table before running a subsequent database operation. The output table is staged by materializing the output table to non-local memory. For example, Operation 1 is completed and the output table of Operation 1, which is 1 MB, is materialized to non-local memory before the output table is used as input for Operation 2. Because materialization is several magnitudes slower than retaining data in place in local memory, there is an added time cost whenever data is materialized. Moreover, the increase in time cost is proportional to the amount of data. That is, there is a greater time cost to materialize the 2 MB outputted from Operation 2 than to materialize the 1 MB from Operation 1 in non-local memory.

Plan B illustrates a pipelined approach. In Plan B, Operation 1 and Operation 2 are pipelined as a group. In Plan B, Operation 3 is in a group 110 and is not pipelined with Operation 1 and Operation 2. FIG. 1 also indicates the volume of data to be transferred between operations. For example, 4 MB of data is inputted into Operation 1, 1 MB of data is outputted from Operation 1 and inputted to Operation 2, and 2 MB of data is outputted from Operation 2 and inputted to Operation 3.

When two operations are pipelined, transferred data between the operations is stored in place in local memory rather than materialized. For example, in Plan B, the 1 MB of data outputted from Operation 1 is retained in local memory and used in place as input to Operation 2. In Plan C, the 2 MB of output from Operation 2 is processed in local memory and used in place as input to Operation 3. Because these execution plans avoid the cost of materializing and reloading materialized input into local memory, the time costs of Plan B and Plan C are each less than the time cost of Plan A.

Additionally, the time costs of Plan B and Plan C are different. In Plan B, the output of Relation 1 (4 MB) and the output of Operation 2 (2 MB) are each materialized, meaning that 6 MB of total data is materialized in Plan B. In Plan C, the output of Relation 1 (4 MB) and the output of Operation 1 (1 MB) are each materialized, meaning that 5 MB of total data is materialized in Plan C. Thus, Plan B has a higher time cost than Plan C.

In order to determine how to group operations, a system may implement a local memory model, a time cost model, and a group formation framework.

Local Memory Model

The local memory model describes the local memory configuration for each database operation in a query plan, the local memory model applying to each task of a database operation. The local memory model categorizes the configuration in mainly two parts: input and output ("I/O") memory usage and internal memory usage.

I/O memory usage refers to the local memory used for input and output of each particular database operation. Internal memory usage refers to the amount of local memory used for internal data structures specific to each database operation.

For example, a hash-based group-by operation may build a hash table in order to perform a hash-based algorithm. The hash table built by the operation consumes an amount of memory, which in this case is considered internal memory usage.

The local memory configuration for a specific database operation is a determined runtime operation. The local memory configuration may be determined according to memory estimation formulae. The inputs of these formulae can be adjusted, resulting in different local memory usage calculations.

In addition, database operations perform differently depending on the amount of available local memory. Such operations are referred to herein as "MSOs" (Memory Sensitive Operations). For example, in the case of hash-based group-by operations, a larger hash table improves efficiency of hash-based group-by operations. One hash table may contain any number of rows, but a hash table for an entire database table may not fit into available local memory or even a non-local memory. Therefore, the database table must be split into smaller subsets of rows for hashing into a smaller hash table that fits into available local memory. There may be a minimum number of rows to include in a subset to effectively perform the hashing, but in many cases, the more rows that can be added to a hash table, the better the efficiency.

The local memory configuration for a hash-based group-by operation may include the following formulae:

(1) I/O local memory usage:

$$LOCAL_{I/O} = \Sigma_{in\_cols} nrows_{in} * colwidth\_in + \Sigma_{out\_cols} nrows_{out} * colwidth\_out$$

where "$\Sigma_{in\_cols}$" is a summation for all input columns, "$nrows_{in}$" is the input rows from 0 to n, "colwidth_in" is the input column width, "colwidth_out" is the output column width, "$\Sigma_{out\_cols}$" is a summation for all output columns, and "$nrows_{out}$" is the output rows from 0 to n.

(2) Internal local memory usage, specifically a local memory hash-table. A simple linked-list-based hash table and a hash table twice the size of the actual data to be hashed may be used to reduce the collision. For this type of hash table, the local memory usage would be estimated as follows:

$$LOCAL_{hashtable} = 2 * nrows_{out} * (sizeof(hash\_value) + sizeof(link\_ref))$$

Where "$nrows_{out}$" references an individual output row from 0 to n, "sizeof(hash_value)" is a size of the hash value for that row, and "sizeof(link_ref)" is a size of the link reference for that row.

Each entry in the hash table has a hash value field, for use in hash table searching, and a link reference to its collision. There is typically no more than one collision per entry. Accordingly, in an embodiment, a maximum of one collision per entry is allowed (the hash table would spill if more collision were needed). Hash table local memory usage does not include the local memory for actual data load, as this is already counted towards the I/O memory usage.

Time Cost Model

The time cost model describes the estimated time cost of a database manipulation operation under a given local memory configuration. Different local memory configurations could impact the time cost of a database manipulation operation in many ways. For example, different I/O local memory configurations could achieve different I/O bandwidth. Moreover, some operations (such as hash-based group-by and join, referred to herein as memory sensitive operations "MSOs") have improved performance when more local memory is used for the internal hashing scheme. Also, by grouping database operations and pipelining their intermediate results through local memory, the total time cost is lower than for staging to non-local memory media. The time cost model receives as input a local configuration of database operations and provides a time cost for the configuration.

Group Formation Framework and Algorithm

Using the time cost model and the local memory model, a group formation framework accepts a non-grouped query plan and returns an improved query plan which indicates how the database operations are pipelined and how the local memory is arranged for each database operation. A group formation algorithm is used to search the optimal query plan configuration based on the local memory model and time cost model.

The algorithm traverses the query plan graph and for each database operation determines whether the database operation should be grouped with a child operation or added to a new group. When describing this algorithm, the term "group" is used to refer to pipelining a group of database operations into a pipelined group. Starting with the leaf node of a graph of operators, the system traverses the entire tree. Each node corresponds to tables that can be loaded. For a first operation of a child operator, the system determines whether a second operation in the parent operator of the child operator can be grouped with the first operation. If two operations cannot be grouped together, then one or both may be grouped alone. This process is described in further detail in FIG. 2.

Figure 2:
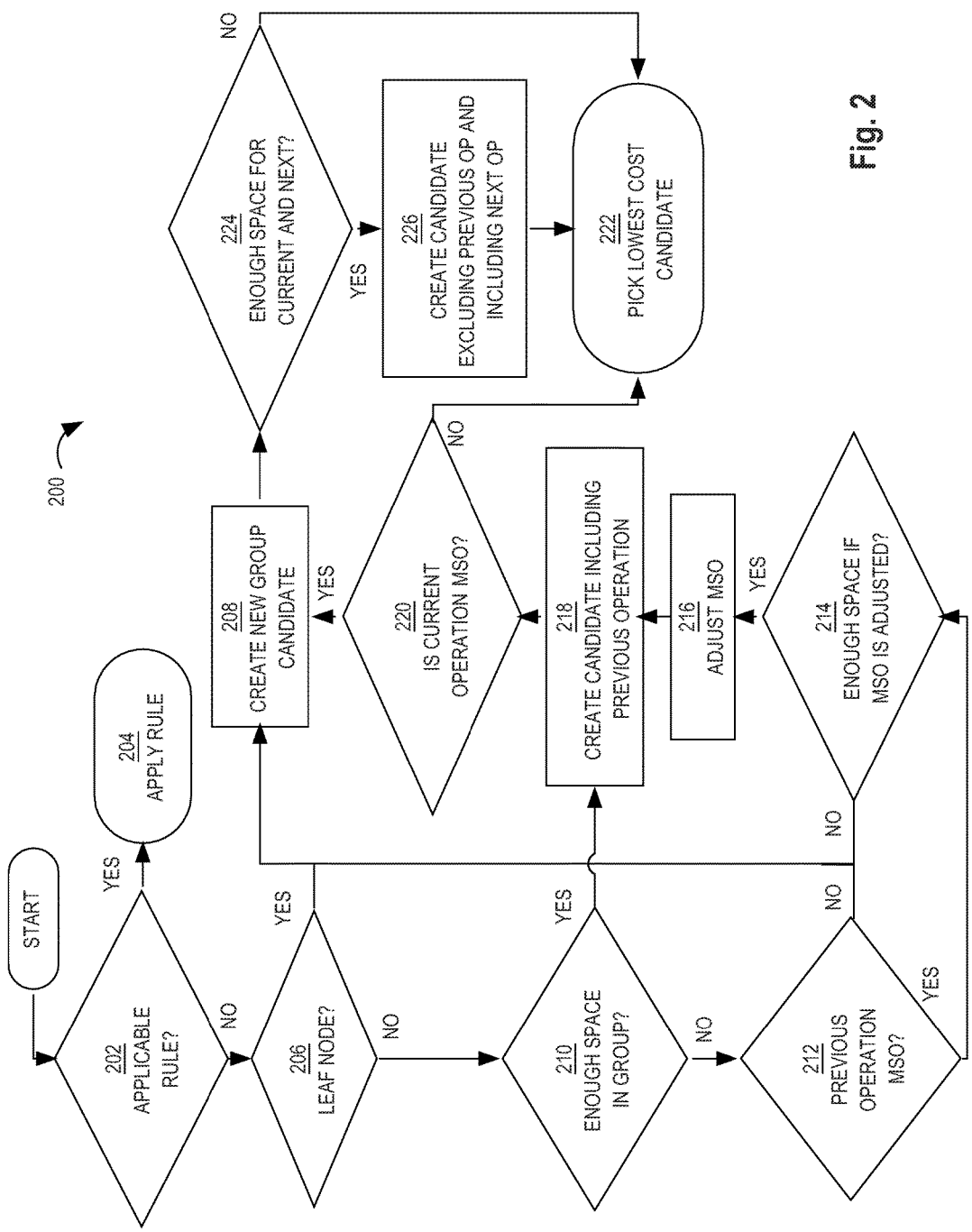
FIG. 2 is an example flow diagram in which a system determines how to group multiple database operations.

FIG. 2 is a flow diagram depicting a procedure for determining how to group multiple database operations.

At step 202, it is determined whether there is a rule in place for how operations are grouped. For example, there may be a rule that dictates that particular kinds of database operations, such as partition operations, should not be pipelined. Such rules may be accorded a highest priority. Accordingly, if there is an applicable rule (e.g., the current operation is a partition operation), at step 204 and the rule is applied. In this way, the time and resources necessary for determining an optimal grouping are saved by applying the rule before going through the rest of the steps of the procedure 200. If there is no applicable rule, the procedure 200 continues to step 206.

At step 206, it is determined whether a current database operation is a leaf node of a query plan tree, or whether there is a previous database operation that the current database operation could be grouped with. If there is no previous database operation, the procedure 200 moves to step 208. If there is a previous database operation, the procedure 200 continues to step 210.

At step 210, it is determined whether there is enough space in local memory to process the previous database operation and the current database operation together. The determination may be based on each operation's minimum memory requirements. If there is enough space for both operations, the procedure 200 moves to step 218. If there is not enough space, the procedure 200 continues to step 212.

At step 212, it is determined whether the previous operation is an MSO. That is, if there is not enough space in local memory to process the previous and current operations together, the system determines whether the amount of memory used by the previous operation can be adjusted. If the previous operation is not an MSO, the procedure 200 moves to step 208. If the previous operation is an MSO, the procedure 200 continues to step 214.

At step 214, it is determined whether there is enough space in local memory to process the previous operation and the current operation together if the memory usage of the previous operation is adjusted. If there is still not enough space, the procedure 200 moves to step 208. If there is enough space after adjusting the previous operation, the procedure 200 continues to step 216.

At step 216, the previous operation is adjusted to reduce the amount of memory used by the previous operation. In an embodiment, the previous operation is only reduced until there is sufficient space for the current operation. In another embodiment, the previous operation is reduced to a minimum amount for the previous operation.

At step 218, the a candidate group is created that includes the current operation and the previous operation.

At step 220, it is determined whether the current operation is an MSO. If the current operation is an MSO, the procedure 200 continues to step 208 and an additional candidate group is created that includes the current operation but not the previous operation. In this case, the additional candidate group would provide the benefit of possibly improving efficiency by assigning all available memory to the current operation. The candidate group created at step 218, on the other hand, would provide a different benefit of improved efficiency through pipelining of the current operation and the previous operation. These two candidate groups, along with any other candidate groups created during the procedure 200, are later compared at step 222 to determine the lowest cost candidate. Alternatively, if the current operation is not an MSO, the procedure 200 moves directly to step 222. In this case, there would be only one candidate group (created at step 218).

At step 208, one or more candidate groups are created for the current operation. For example, if the current operation is a leaf node or if there is not enough space in local memory for both the current operation and the previous operation, the system may create a candidate group that includes just the current operation. If there is enough space in local memory for both the current operation and the previous operation, the system may create a candidate group that includes both the current operation and the previous operation. Additionally, if either the previous operation or the current operation is an MSO, multiple candidate groups including both the previous operation and the current operation may be created in which each candidate group includes a different allotment of memory for each of the operations.

At step 224, it is determined whether there is enough space in local memory for both the current operation and a next operation. If so, the procedure 200 continues to step 226. If not, the procedure 200 continues to step 222.

At step 226, a candidate group including both the current operation and the next operation is created.

At step 222, a lowest time cost candidate for the current operation is selected from the candidate groups. For example, candidate groups may include a first group including just the current operation, a second group including the current operation and the previous operation, a third group including the current operation and the next operation, and additional variations of the second and third groups with different allotments of memory for each operation (assuming any of the operations is an MSO). Whichever group of the candidate groups provides the lowest time cost is used for grouping the current operation. The system may determine time cost by use of the time cost model. The system goes through all operations in the query plan and applies the group formation decision recursively. The local memory is assigned based on the I/O requirements of the operations and the internal usage of any MSO operations. The algorithm of assigning local memory to the I/O of an operation is discussed in the following section.

Steps of FIG. 2 may be skipped based on available resources or the number of operations. For example, if a set includes only 3 operations, then there are only a limited number of combinations for grouping the operations. In such a case, none of the steps of FIG. 2 may be skipped. However, if a set includes 20 operations, steps in the process may be skipped. For example, a process may not involve determining whether operations are MSOs. As another example, a process may not involve determining whether a current operation and a next operation can be grouped together.

I/O Unit Size Adjustment Algorithm

I/O unit size refers to the size of the input of a database operation and the size of the output of a database operation. The I/O unit size of each database operation in a group is assumed to be a minimum value when the group formation algorithm is applied. After the group formation is done, there may be extra local memory available for each group. If the operation(s) in the group is not an MSO, the I/O unit size may be adjusted up by increasing input and/or output of the database operation.

Because each group may contain one or more database operations, to optimize performance each operation may have different requirements on the I/O unit size. For example, if a Filter operation utilizes bit-vector and bit-gathering for materializing its output, the output unit size should be large. This is because (1) regardless of the input size, each row only uses one bit for its output, and (2) bit-gathering has its own overhead so the Filter operation will perform better by processing a larger number of rows for amortizing the overhead.

Some database operations may have asymmetric requirements for input and output unit sizes. For example, Partition operations utilize fan-out and therefore operate better with greater input size. Simply assigning the same amount of local memory to both input and output, or keeping a 1:1 ratio on the input and output unit size would not fully utilize the local memory performance.

Therefore, an optimal I/O unit size of each operation is determined to maximize the runtime efficiency of a group containing one or more operations. The following three factors can be used to effectively scale the I/O unit size.

First, the total local memory usage of each operation in a group can be estimated. The estimation can be based on each operation-specific local memory model. The total local memory usage for each operation should be limited by the total amount of local memory available for the group the operation is in.

Second, if an operation requires a specific ratio between input and output unit sizes, this ratio may be maintained when scaling the I/O unit. In some cases, either the input or output, but not both, is scaled up to utilize any remaining local memory.

Third, if an operation is an MSO, the minimum I/O unit size may be determined and any remaining local memory may be assigned to the internal usage of the operation so as to boost the efficiency as much as possible.

Figure 3:
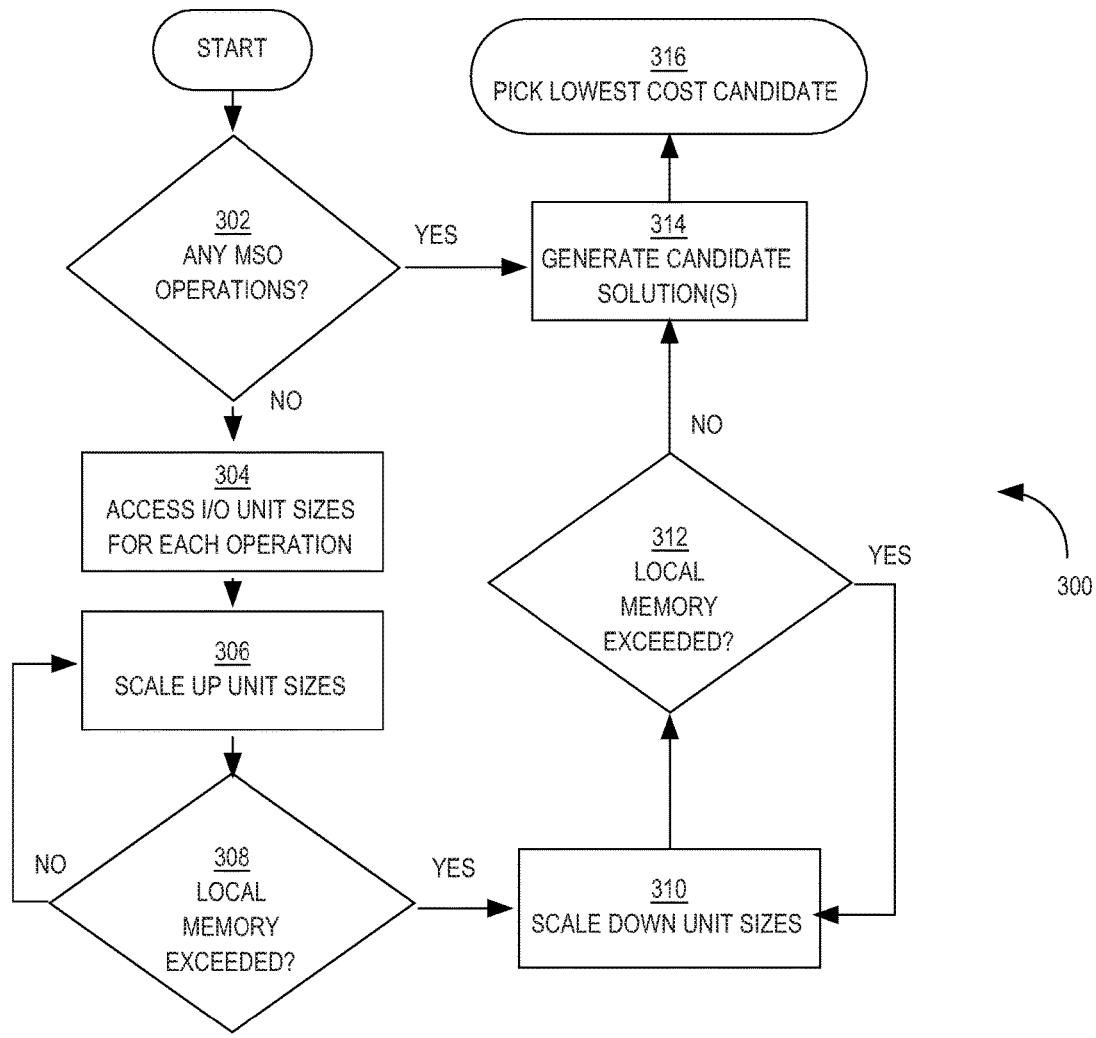
FIG. 3 is a flow diagram illustrating how the I/O unit size adjustment algorithm may be utilized.

FIG. 3 is a flow diagram illustrating how the I/O unit size adjustment algorithm may be utilized.

At step 302, it may be determined whether any MSO operations are included in the current group. If not, the procedure 300 continues to step 304. If there are MSO operations included in the current group, the procedure 300 moves to step 314.

At step 304, a ratio of input and output unit sizes is accessed for each operation. The ratio may be provided by operation-specific information provided as input information or from system-level metadata information.

At step 306, the accessed ratio is scaled up. In one embodiment, the input and output unit sizes are each doubled. For example, if the ratio is 1:4, the scaled-up ratio would be 2:8.

At step 308, it is determined whether there is enough space in local memory for the scaled-up unit sizes. If there is enough space, the procedure 300 returns to step 306 and the ratio is scaled up again. If there is not enough space, the procedure 300 continues to step 310.

At step 310, the unit sizes are scaled down. The scaling value is the minimum reduction while maintaining the accessed ratio. For example, if the scaled-up values are 2 and 8, the scaled-down ratio would be 1:4.

At step 312, it is determined whether there is enough space in local memory for the scaled-up unit sizes. If there is not enough space, the procedure 300 returns to step 310 and the ratio is scaled down again. If there is enough space, the procedure 300 continues to step 314.

At step 314, a candidate grouping is generated. The candidate grouping may be based on the scaled-down unit sizes.

If the current group includes one or more MSO operations (as determined at step 302), one or more candidate solutions for assigning any remaining local memory to the MSO operations may be generated. If there are n MSO operations in the group, where n is larger than 1, there will be (n+1) candidate solutions generated: n solutions for assigning the remaining local memory to each of the MSO operations, and an additional solution for evenly distributing the remaining local memory between all n MSO operations.

At step 316, a candidate solution is selected. In an embodiment, the candidate solution is selected based on the time cost model.

As shown above, by grouping database operations and running them together in local memory, a pipelining effect can be achieved that avoids unnecessary I/O cost. For example, a query may include two operations: filter and expression. Without group formation, a system may create two operations: one for filter condition and one other for expression evaluation. Local memory would be fully utilized for each operation, and each result would be transmitted through a slower materialization. By applying group formation, both filter and expression can be contained in the same group, and the output of the filter operation would be directly pipelined into the expression operation. Pipelining also involves sharing the output buffer of the filter operation. Given that materialization is always several magnitudes slower than local memory pipelining, the overall performance is improved through pipelining.

Moreover, a combination of rule-based and cost-based approaches reduces the search space and improves efficiency. For example, rule-based approaches can utilize best-practice knowledge to directly form groups without utilizing time and resources to expand the search space. There are theoretically exponential amounts of options to form groups for a given query plan. Therefore, while group formation can locate the global minimum cost among all possible group formation options, utilizing rules along with cost-based analysis improves efficiency.

For example, a query may include the following database operations: partition 1, partition 2, join build, and join probe. Applying only the cost-based approach for group formation would require considering several options, including the following: (1) creating a separate group for each of the operations, (2) grouping partition 1 and join build together and creating separate groups for each of partition 2 and join probe, and (3) create separate groups for partition 1 and partition 2 and grouping join build and join probe together. However, based on best-practice rules, it may be known that, for example, join build and join probe perform better when grouped together because the hash table built from join build could be shared to join probe without being materialized. Moreover, it may further be known that partition is a pipeline-breaker operation because it needs to partition data onto multi-nodes throughout the network. That is, the partition operation should not be grouped with other database operations. Based on these known facts, it can quickly be determined that option (3) is the most cost-effective option.

Query Execution

Before executing a query execution plan, the database operations are scheduled for operation. Executing the execution plan entails assigning the database operations for execution to slave processes or threads. Generally, a database operation may be split into tasks, each of which are assigned to a slave process.

In an embodiment of the present invention, a slave process may be assigned a task for executing the pipelined group. When executing the pipelined group, the slave process executes the first database operation in the group, storing the output in local memory. The output is not materialized. A subsequent database operation in the group uses the output in place as input. Ultimately, the last database operation in the pipelined group generates output, which may be materialized to non-local memory.

Advantages Over Other Techniques

Some traditional database processing techniques utilize a "Volcano" model and have been widely used in relational database systems. However, such techniques are not optimized for local memory usage. In particular, the Volcano model is a pull-based model that does not provide an opportunity to maximize pipelining in a group of database operations. The approaches described herein address this issue through use of cost-based and rule-based determinations.

Not Only Structure Query Language (NoSQL) data processing platforms, such as Hadoop and Spark, provide scalable systems for processing big-volume data. However, such platforms are also not designed to utilize local memory efficiently for queries. For example, Hadoop requires materialization onto slow persistent storage for each round of map or reduce phases. Spark maximizes in-memory processing for DRAM or non-local memory utilization. However, Spark only supports block breaking at shuffling and is therefore not a dynamic approach to group database operations.

Other techniques seek to provide improved pipelining and cache performance by buffering intermediate results between operations. However, these approaches do not consider operation efficiency with respect to I/O unit sizes and do not provide an optimal pipelining plan based on cost.

Still other techniques apply logic to detect pipeline-able operations based on the amount of intermediate result and the total limit of the buffer cache. However, such techniques apply to DRAM or non-local memory rather than local memory and do not consider block-based pipelining. Instead, the intermediate result is assumed to be fully cached.

Some query processing frameworks (e.g., HyPer) utilize pipelining in local memory bounded through pipeline-breakers. However, these frameworks focus on keeping data in registers as much as possible and therefore utilize local memory in only a very limited way. Moreover, such frameworks do not utilize a local memory model or time cost model to determine where a pipeline is broken.

Software Overview

Figure 4:
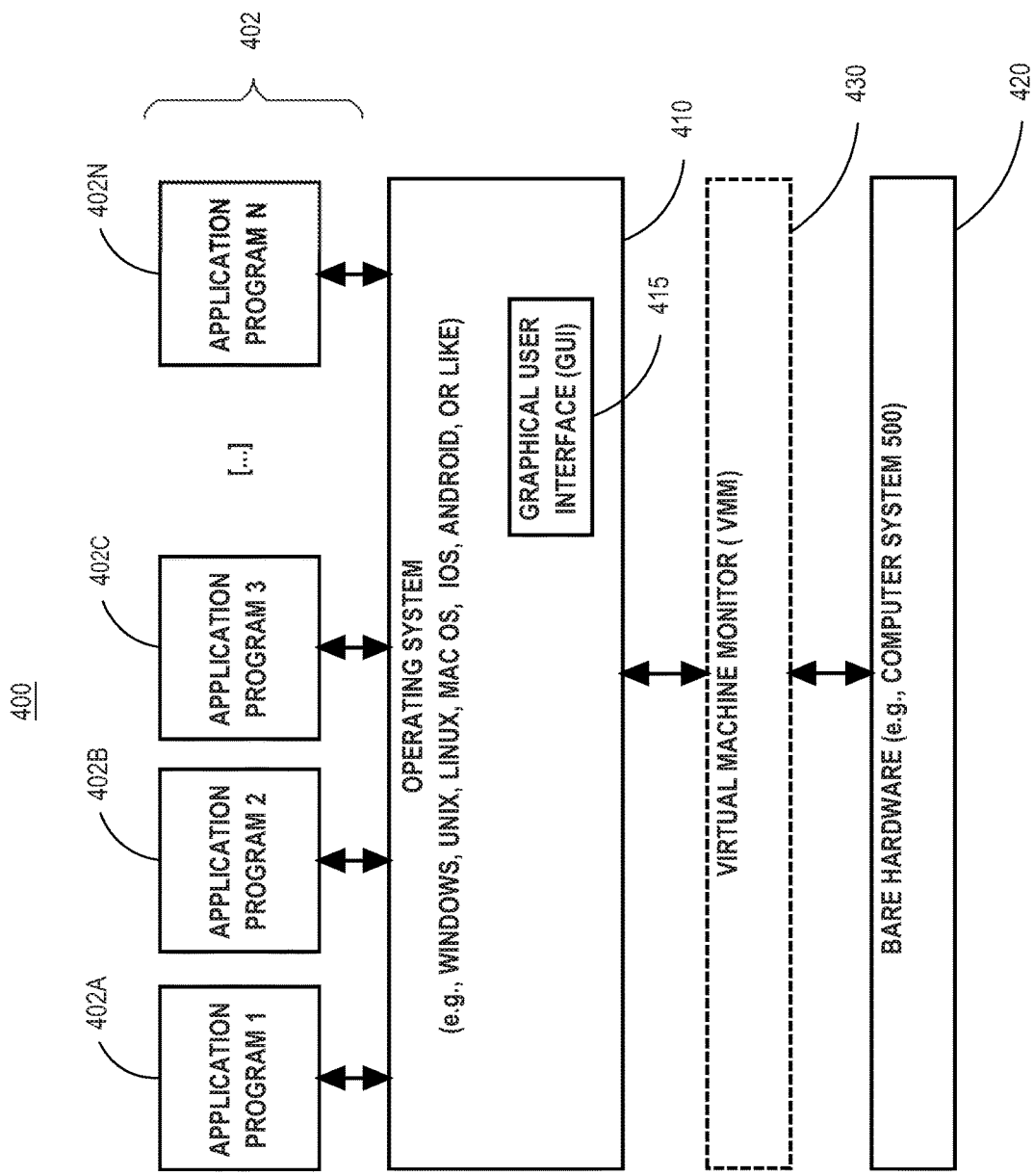
FIG. 4 is a block diagram of a basic software system 400 that may be employed for controlling the operation of computing system 500.
Figure 5:
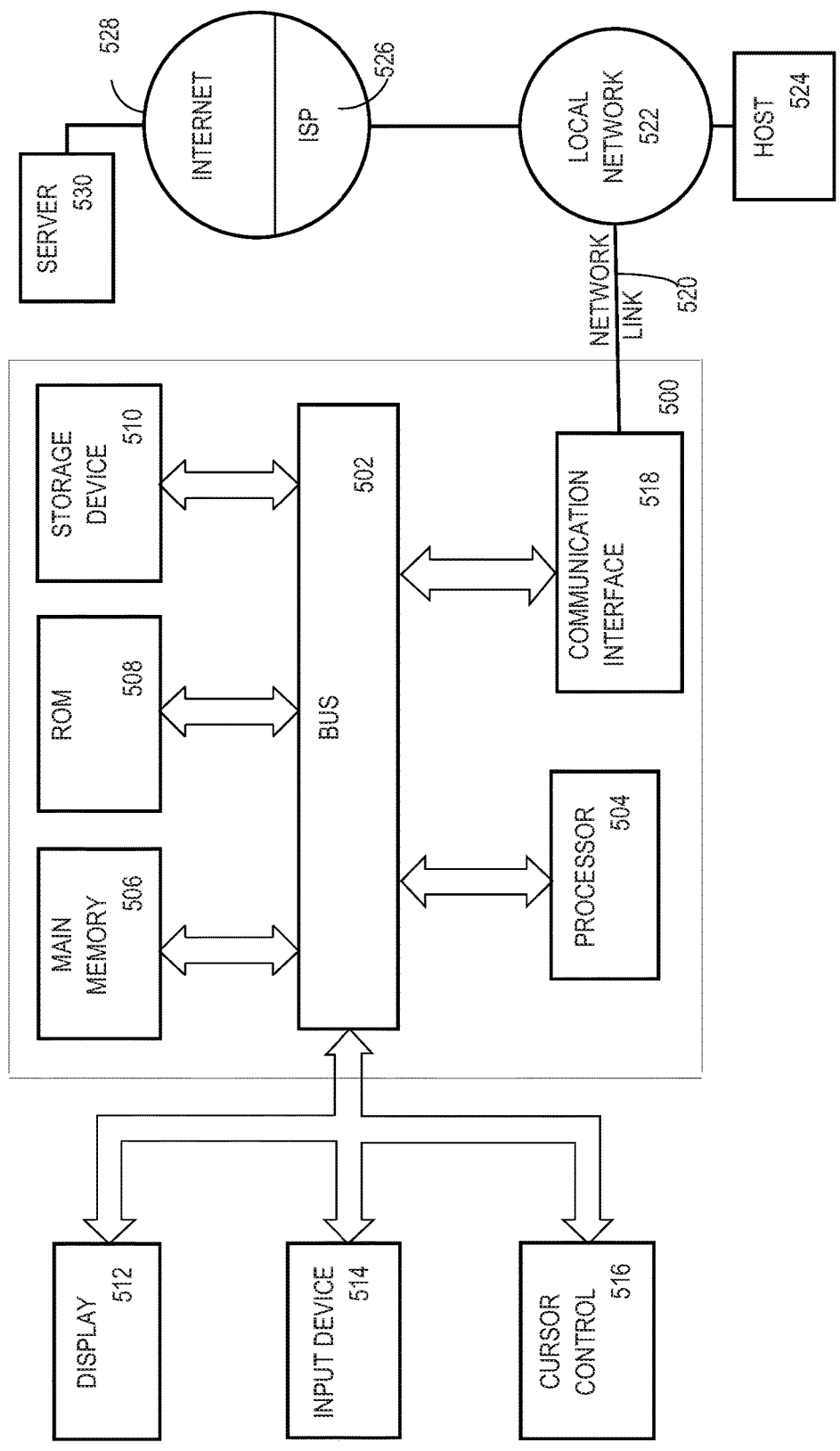
FIG. 5 depicts a computer system upon which an embodiment may be implemented.

FIG. 4 is a block diagram of a basic software system 400 that may be employed for controlling the operation of computing system 500 of FIG. 5. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 46 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 46, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
adding a first operation for a first leaf operator of a query execution plan to a first pipelined group, wherein said query execution plan includes a set of leaf operators and a set of non-leaf operators, each leaf operator of said set of leaf operators having a respective parent non-leaf operator, each non-leaf operator having one or more child operators from among: said set of leaf operators or others of said set of non-leaf operators;
determining a memory requirement of executing said first operation for said first leaf operator and executing a second operation for the respective parent non-leaf operator of said first leaf operator, wherein output of said first operation is input to said second operation;
determining whether said memory requirement is satisfied by an amount of local memory;
in response to determining that said memory requirement is satisfied by said amount of local memory, adding the second operation for the respective parent non-leaf operator to the first pipelined group;
assigning said first pipelined group to a first thread; and
said first thread executing said first pipelined group, wherein executing said first pipelined group includes:

storing first output of said first operation in said local memory of said first thread;

using said first output as input for said second operation;

storing second output of said second operation in said local memory; and moving second output from said local memory to a tier of memory different than said local memory relative to said first thread.

2. The method of claim 1, further comprising:

in response to determining that said memory requirement is satisfied by said amount of local memory, calculating a time cost of grouping the first operation together with the second operation;

determining a second memory requirement of executing said second operation and executing a third operation for the respective parent non-leaf operator of said second operation; and in response to determining that said second memory requirement is satisfied by said amount of local memory, calculating a time cost of grouping the second operation together with the third operation.

3. The method of claim 2, further comprising:

in response to determining that the calculated time cost of grouping the first operation together with the second operation is less than the time cost of grouping the second operation together with the third operation, adding the second operation to the first pipelined group.

4. The method of claim 2, further comprising:

in response to determining that the calculated time cost of grouping the first operation together with the second operation is greater than the time cost of grouping the second operation together with the third operation, adding the second operation and the third operation to a second pipelined group and not adding the second operation to the first pipelined group.

5. The method of claim 1, further comprising:

in response to determining that the first operation is a memory sensitive operation that improves with increased available memory, not adding the second operation to the first pipelined group.

6. The method of claim 1, further comprising:

in response to determining that the first operation is a memory sensitive operation that improves with increased available memory, assigning any unused memory of the local memory to the first operation.

7. The method of claim 1, further comprising:

in response to determining that both the first database operation and the second operation are memory sensitive operations that improve with increased available memory:

calculating a first time cost of assigning any unused memory of the local memory to the first operation;

calculating a second time cost of assigning any unused memory of the local memory to the second operation;

calculating a third time cost of assigning any unused memory of the local memory equally between the first operation and the second operation; and based on the calculated first, second, and third time costs, assigning any unused memory so as minimalize overall time cost.

8. The method of claim 1, further comprising:

in response to receiving a rule indicating that the first operation should be grouped separately, not adding any operations other than the first operation to the first pipelined group.

9. The method of claim 1, further comprising:

calculating a first time cost of adding the second operation to the first pipelined group;

calculating a second time cost of adding the second operation and a third operation to a second pipelined group;

calculating a third time cost of adding the third operation and a fourth operation to the second pipelined group;

calculating a fourth time cost of adding the fourth operation and a fifth operation to the third pipelined group; and based on the calculated first, second, third, and fourth time costs, assigning the first operation and second operation to minimalize overall time cost.

10. One or more non-transitory computer-readable media storing instructions that, when executed by one or more processors, cause:

adding a first operation for a first leaf operator of a query execution plan to a first pipelined group, wherein said query execution plan includes a set of leaf operators and a set of non-leaf operators, each leaf operator of said set of leaf operators having a respective parent non-leaf operator, each non-leaf operator having one or more child operators from among: said set of leaf operators or others of said set of non-leaf operators;

determining a memory requirement of executing said first operation for said first leaf operator and executing a second operation for the respective parent non-leaf operator of said first leaf operator, wherein output of said first operation is input to said second operation;

determining whether said memory requirement is satisfied by an amount of local memory;

in response to determining that said memory requirement is satisfied by said amount of local memory, adding the second operation for the respective parent non-leaf operator to the first pipelined group;

assigning said first pipelined group to a first thread; and said first thread executing said first pipelined group, wherein executing said first pipelined group includes:

storing first output of said first operation in said local memory of said first thread;

using said first output as input for said second operation;

storing second output of said second operation in said local memory; and moving second output from said local memory to a tier of memory different than said local memory relative to said first thread.

11. The one or more non-transitory computer-readable media of claim 10 wherein the instructions, when executed by the one or more processors, further cause:

in response to determining that said memory requirement is satisfied by said amount of local memory, calculating a time cost of grouping the first operation together with the second operation;

determining a second memory requirement of executing said second operation and executing a third operation for the respective parent non-leaf operator of said second operation; and in response to determining that said second memory requirement is satisfied by said amount of local memory, calculating a time cost of grouping the second operation together with the third operation.

12. The one or more non-transitory computer-readable media of claim 11 wherein the instructions, when executed by the one or more processors, further cause:

in response to determining that the calculated time cost of grouping the first operation together with the second operation is less than the time cost of grouping the second operation together with the third operation, adding the second operation to the first pipelined group.

13. The one or more non-transitory computer-readable media of claim 11 wherein the instructions, when executed by the one or more processors, further cause:

in response to determining that the calculated time cost of grouping the first operation together with the second operation is greater than the time cost of grouping the second operation together with the third operation, adding the second operation and the third operation to a second pipelined group and not adding the second operation to the first pipelined group.

14. The one or more non-transitory computer-readable media of claim 10 wherein the instructions, when executed by the one or more processors, further cause:

in response to determining that the first operation is a memory sensitive operation that improves with increased available memory, not adding the second operation to the first pipelined group.

15. The one or more non-transitory computer-readable media of claim 10 wherein the instructions, when executed by the one or more processors, further cause:

in response to determining that the first operation is a memory sensitive operation that improves with increased available memory, assigning any unused memory of the local memory to the first operation.

16. The one or more non-transitory computer-readable media of claim 10 wherein the instructions, when executed by the one or more processors, further cause:

in response to determining that both the first database operation and the second operation are memory sensitive operations that improve with increased available memory:

calculating a first time cost of assigning any unused memory of the local memory to the first operation;

calculating a second time cost of assigning any unused memory of the local memory to the second operation;

calculating a third time cost of assigning any unused memory of the local memory equally between the first operation and the second operation; and based on the calculated first, second, and third time costs, assigning any unused memory so as minimalize overall time cost.

17. The one or more non-transitory computer-readable media of claim 10 wherein the instructions, when executed by the one or more processors, further cause:

in response to receiving a rule indicating that the first operation should be grouped separately, not adding any operations other than the first operation to the first pipelined group.

18. The one or more non-transitory computer-readable media of claim 10 wherein the instructions, when executed by the one or more processors, further cause:

calculating a first time cost of adding the second operation to the first pipelined group;

calculating a second time cost of adding the second operation and a third operation to a second pipelined group;

calculating a third time cost of adding the third operation and a fourth operation to the second pipelined group;

calculating a fourth time cost of adding the fourth operation and a fifth operation to the third pipelined group; and based on the calculated first, second, third, and fourth time costs, assigning the first operation and second operation to minimalize overall time cost.

* * * * *